US012418507B2

(12) United States Patent
Metz

(10) Patent No.: US 12,418,507 B2
(45) Date of Patent: Sep. 16, 2025

(54) NETWORK SECURITY DEVICE

(71) Applicant: Level 3 Communications, LLC, Broomfield, CO (US)

(72) Inventor: Bobby W. Metz, Tempe, AZ (US)

(73) Assignee: Level 3 Communications, LLC, Denver, CO (US)

( * ) Notice: Subject to any disclaimer, the term of this patent is extended or adjusted under 35 U.S.C. 154(b) by 690 days.

(21) Appl. No.: 17/375,696

(22) Filed: Jul. 14, 2021

(65) Prior Publication Data

US 2022/0021653 A1    Jan. 20, 2022

Related U.S. Application Data

(60) Provisional application No. 63/052,734, filed on Jul. 16, 2020.

(51) Int. Cl.
*H04L 29/06* (2006.01)
*H04L 9/40* (2022.01)

(52) U.S. Cl.
CPC ...... *H04L 63/0263* (2013.01); *H04L 63/0236* (2013.01); *H04L 63/029* (2013.01); *H04L 63/168* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,996,102 B2* | 2/2006 | Pegrum | H04L 47/15 370/384 |
| 2018/0220327 A1* | 8/2018 | Karampatsis | H04W 72/569 |
| 2020/0112458 A1* | 4/2020 | Li | H04L 12/4633 |
| 2021/0117360 A1* | 4/2021 | Kutch | G06F 3/0656 |

* cited by examiner

*Primary Examiner* — Sanchit K Sarker

(57) ABSTRACT

An out-of-the-box security device is described for a local network to extend security features offered by a communications network to the local network. Communications of the security device to the network may include a secure, layer 2 or layer 3 communication tunnel established with a security platform of the network. Aspects of the security device, such as a security profile and other security information, may be configured or provided by the security platform via the secure tunnel such that installation costs of the device are reduced. Further, the security features of the network may be extended to the local network via the security device for local networks that connect to the network through one or more other networks. Such security features may be provided by the security device at the local network or may be provided by the network based on a flag bit asserted by the security device.

13 Claims, 7 Drawing Sheets

NETWORK SECURITY DEVICE

CROSS-REFERENCE TO RELATED APPLICATION

This application is related to and claims priority under 35 U.S.C. § 119(e) from U.S. Patent Application No. 63/052,734, filed Jul. 16, 2020 entitled "NETWORK SECURITY DEVICE," the entire contents of which is incorporated herein by reference for all purposes.

TECHNICAL FIELD

Embodiments of the present invention generally relate to apparatus, systems, and methods for implementing a communications network, and more specifically for a security device communicating with a network to receive threat data or information to configure the device against network attacks.

BACKGROUND

Providing secure communications between devices is an important component of communication networks. Many communications networks therefore include one or more devices to provide security to the network devices and/or devices utilizing the network to communicate. For example, many networks include a firewall device to control or monitor incoming and outgoing traffic to/from a network or network device. Firewall devices are typically dispersed at entry points in/out of a network such that potentially harmful or malicious communications and data can be detected and, in some instances, discarded or blocked by the firewall. The primary purpose of a firewall is to act as the first line of defense against malicious and unauthorized traffic from affecting a network, keeping the information that an organization does not want out, while allowing approved information to securely flow into and out of the network. Other security devices or systems, such as scrubbers, may respond to denial-of-service attacks, phishing schemes to obtain sensitive information, malware distribution in or on the network, and the like. Through the collection of security procedures and devices, a network may be situated to respond to attacks and protect the communications within and transmitted through/from the network.

Network engineers may establish and implement one or more policies for the security devices of the network, the policies defining the security protocols executed by such devices. However, security policies typically require a device to be directly connected to the network to receive the security protocols and/or be managed by a security policy of the network. For devices and local networks connected to the network via separate or distinct networks, such application of security policies may not be available or may be limited. The security policies for disconnected devices (devices connected to a managed network through a third-party network) and local networks are typically managed or created by devices local to the connecting network. As such, the portability of security policies for a network may be limited.

It is with these observations in mind, among other, that aspects of the present disclosure were conceived.

SUMMARY

One aspect of the present disclosure relates to a device providing security features of a network. The device may include a processing device and a non-transitory computer-readable medium encoded with instructions. When the instructions are executed by the processing device, the instructions cause the processing device to perform the operations of receiving, via a layer 2 or layer 3 encryption communication tunnel to a security system of a communication network, a processing rule for transmission of communication packets originating from a local network device, the processing rule associated with a security profile of a local area network, obtaining a destination address associated with a communication packet received from the local network device, and transmitting, based on a comparison of the destination address to the processing rule, the communication packet to an edge device of the communication network.

Another aspect of the present disclosure relates to a device providing security features of a network. The device may include a processing device and a non-transitory computer-readable medium encoded with instructions. When the instructions are executed by the processing device, the instructions cause the processing device to perform the operations of receiving, over a secure communication tunnel, a network address identification to which to block communications originating from a local network device and blocking transmission of a communication packet when a destination address of the communication packet matches the network address identification.

Yet another aspect of the present disclosure relates to a method for operating a data network. The method may include the operations of establishing a secure encryption communication tunnel between a security device located in a local area network and a security system of a communication network and receiving, at the local security device from the security system via the secure encryption communication tunnel, a processing rule for transmission of communication packets originating from the local area network. The method may further include the operations of obtaining a destination address associated with a communication packet received from a local network device in communication with the local area network and transmitting, based on a comparison of the destination address to the processing rule, the communication packet to an edge device of the communication network.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Figure 1:
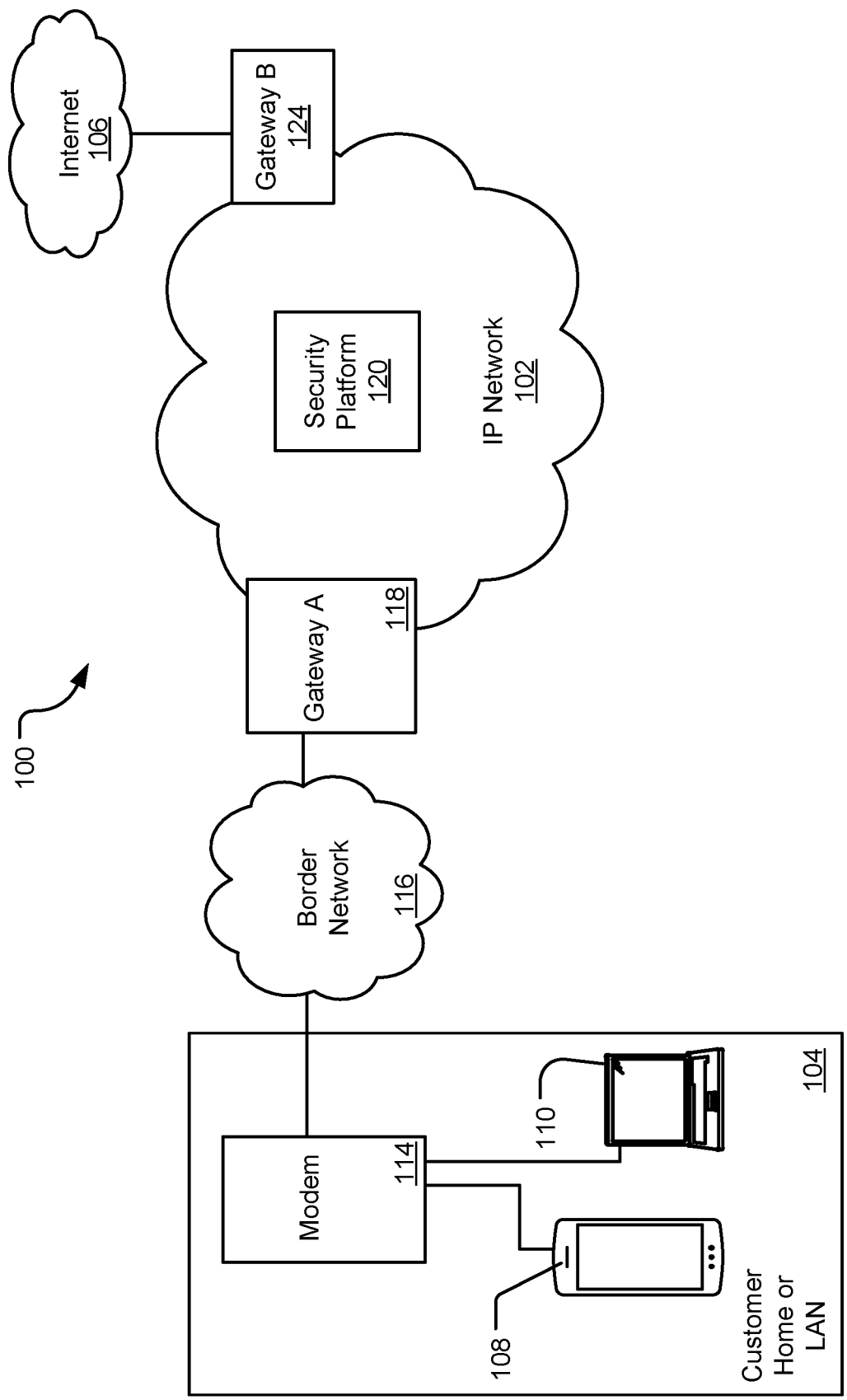
FIG. 1 is a schematic diagram illustrating an exemplary Internet Protocol (IP) operating environment in accordance with one embodiment.

Aspects of the present disclosure involve apparatus, systems, methods, and the like, for securely processing communications associated with a network. In one implementation, a security device may connect to and communicate with a backbone network over a secure layer 2 or layer 3 tunnel to facilitate application of a security policy to communications processed by the security device. Through the layer 2 or layer 3 tunnel, a security platform of the network may provide one or more security policies for implementation by the security device. For example, the security device may be connected to a home network or local area network (LAN). The security device, upon connection, may establish a secure, layer 2 communication tunnel to a security platform of the network. The security device may communicate with the security platform of the network via the layer 2 or layer 3 communication tunnel to receive security policies, updates, white lists, threat assessments, and/or any security-related information to aid the secure device in processing communications intended for the network. In one particular example, the security platform may provide a white/black list of Internet Protocol addresses or other security policies to the secure device for implementation or execution by the device. The security device may, in turn, apply the white/black list to communications on ingress or egress from the home or local network. Other security policies may also be provided to the local security device via the layer 2 or layer 3 tunnel. In this manner, the local security device may provide an extension of the network security to the home or local network or otherwise beyond a footprint of the backbone network.

In some implementations, the security policy provided to the local security device may include threat intelligence data or information associated with potential threats to a communications network. For example, threat intelligence data may include source or destination Internet Protocol (IP) addresses associated with packets known or suspected to be malicious or part of an attack on the network. Other threat intelligence data may include domain name information associated with a security threat, malware-related packets or device information, information associated with computing viruses, and the like. The security platform may process the threat intelligence data to determine one or more configurations to apply to the local security device. For example, the system may identify a source (e.g., a source IP address), a file, a request, a communication, a destination (e.g., a destination IP address), a domain or portion of a domain or domains, a series of communications, etc. that relate or form a part of an attack on a device or devices of the network. The security platform may then generate a rule or action to respond to the identified attack, such as a firewall rule for a firewall device to block traffic from the source of the attack. The generated rule or action may then be transmitted to the security device via the secure, layer 2 or layer 3 tunnel for implementation by the security device at a local network.

In some implementations, the security policy of the network may be applied by a scrubbing platform of the network based on a flag set by the local security device. For example, communications received at the network that include the set flag bit may be routed to the scrubbing platform of the network for processing based on the security policy for the network. In one implementation, the flag bit may be included in a Differentiated Services Code Point (DSCP) portion of a header of the communication packet. Thus, the local security device may determine a communication is a potential security hazard for the network and, in response, alter the DSCP portion of the header of packets transmitted from the local network to the network. When the communication packet is received at the network edge, the packet may be routed to the scrubbing platform for further security processing. In one implementation, a second secure, layer 2 or layer 3 communication tunnel may be established by the local security device to the network edge for secure transmission of flagged communications to the network. In still other implementations, the local security device may implement portions of a security policy (such as a white list of allowed IP addresses or black list of denied IP addresses) and/or set the flag bit in the header of the packet for additional security processing by the scrubbing platform.

One implementation of the local security device may include automatic installation at the local network or home network. In one example, the security device may establish the secure, layer 2 or layer 3 communication tunnel to a security platform of a network upon connection of the security device to a network facing port. The security device may be configured to call to or otherwise communicate with the security platform upon connection to the network to begin receiving security configuration information. In another example, an installer of the security device may scan an identification mark associated with the security device to access a portal or other user interface of the network and register the device with the network using one or more unique identifiers associated with the security device. Upon activation, the security device may be controlled or managed by the security platform to provide or execute security features of the network via the layer 2 or layer 3 communication tunnel.

FIG. 1 illustrates an exemplary operating environment 100 for providing security procedures in one or more networks, including an IP network 102, border network 116, a local network, etc. In general, the environment 100 provides for establishing communication sessions between network users and for providing one or more network services to network users. For example, users may utilize the network 102 to communicate via the network using communication devices, such as telephone devices and/or mobile communication devices. In another example, content from a content delivery network (CDN) or the Internet may be provided to and/or from one or more customers of the network 102 through the operating environment 100. In still another example, the network environment 100 may facilitate communications between networks managed or administered by separate entities, such as communications between IP network 102 and customer home network or local area network (LAN) 104. With specific reference to FIG. 1, the environment 100 includes an IP network 102, which may be provided by a wholesale network service provider. However, while the environment 100 of FIG. 1 shows a configuration using the IP network 102, it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The IP network 102 includes numerous components such as, but not limited to gateways, routers, route reflectors, and registrars, which enable communication and/or provides services across the IP network 102, but are not shown or described in detail here because those skilled in the art will readily understand these components. Communications between the IP network 102 and other entities or networks, such as one or more customer home or business local area networks (LANs) 104, may also be managed through network environment 100. Local network 104 can include communication devices such as, but not limited to, a personal computer 110 or mobile computing device 108 connected to a modem 114. Modem 114 provides an interface for the communication devices 108, 110 of the home network 104. The communication and networking components of the local network 104 enable a user at the local network to communicate to the IP network 102 to receive services from the network 102, to other communication devices connected to the network, and/or the Internet 106. Components of the local network 104 are typically home- or business-based, but they can be relocated and may be designed for easy portability. For example, the communication device 108 may be wireless (e.g., cellular) telephone, smart phone, tablet or portable laptop computer. In some embodiments, multiple communication devices in diverse locations that are owned or operated by a particular entity or customer or by separate entities may be connected through the home network or LAN 102 for communication with the IP network 102.

The local network 104 typically connects to the IP network 102 via a border network 116, such as one provided by an Internet Service Provider (ISP). The border network 116 is typically provided and maintained by a business or organization such as a local telephone company or cable company. The border network 116, also referred to as a peer network, may provide network/communication-related services to their customers. Border network 116 may provide connection to IP network 102 or to other communication devices or networks connected to border network 116.

Networks, such as the Internet 106 and border network 116 may connect to IP network 102 through one or more interface devices. Interface devices may include, but are not limited to, media gateway device A 118 and media gateway device B 124. For ease of instruction, only border network 116 and the Internet 106 are shown connecting to IP network 102; however, numerous such networks, and other devices, may be connected with the network 102, which is equipped to handle enormous numbers of simultaneous calls and/or other IP-based communications.

IP network 102 may provide various telecommunication or computing services to customers of the network, including security features to protect the connected devices from malicious attacks or software. In one implementation, the IP network 102 may include a security platform 120 to monitor communications within the network and execute a mitigation procedure in response to detected malicious activity. In one example, the security platform 120 may provide a firewall service that executes, along with other devices of the network, gatekeeping functions for communications into or out of the local network based on one or more lists of Internet Protocol (IP) addresses. The firewall service may block, re-route, deny, flag, etc. communications entering or leaving a local network based on a set of firewall rules. Other security services, such as secure Domain Name Server (DNS), adaptive network security (ANS) service, anti-virus, malware protection, etc. may also be provided by the network 102 to customers of the network, with or without the security platform 120. However, many such services are limited to networks and devices connected to or managed by an administrator of the IP network 102. Customers that connect to the IP network 102 through an ISP or other border network 116 not managed by the IP network 102 may not have available one or more of the security services of the network. For example, local network 104 may not receive a firewall service or other security service from IP network 102 but may instead need to rely on border network 116 to provide such security for communications into and out of the local network 104.

Figure 2A:
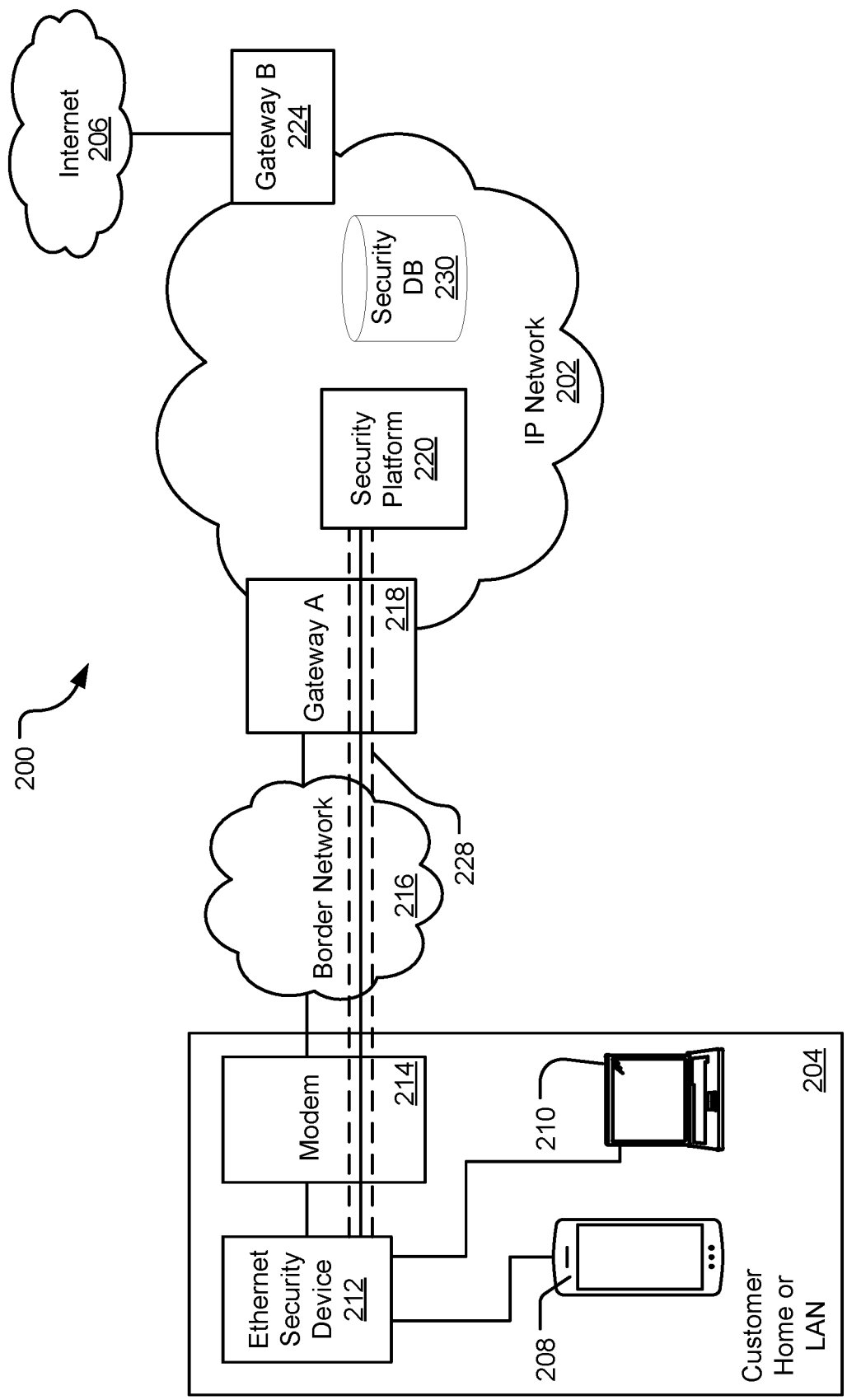
FIG. 2A is a schematic diagram illustrating an Ethernet-based security device in a network environment for security management of communications associated with a local network in accordance with one embodiment.

FIG. 2A is a schematic diagram illustrating an Ethernet-based security device 212 in a network environment 200 for security management of communications associated with a local network in accordance with one embodiment that extends the security features of the IP network 202 to a local network 204 connected to the network via an intermediary network, such as border network 216. Many of the components of the network environment 200 of FIG. 2A are similar to those described above with reference to FIG. 1, including IP network 202, Internet network 206, border network 216, local network 204, and the associated components of each network. In the environment 200 of FIG. 2A, however, an Ethernet-based security device 212 may be included in or associated with the local network 204. In general, the Ethernet security device 212 may exchange layer 2 or layer 3 communications with the IP network 202 to provide one or more security features of the IP network 202 to the local network 204, despite connecting to the network 202 via a separate border network 216. Operation of the security device 212 in relation to providing security services of the IP network 202 is discussed in greater detail below with reference to FIGS. 4 and 5.

Figure 3:
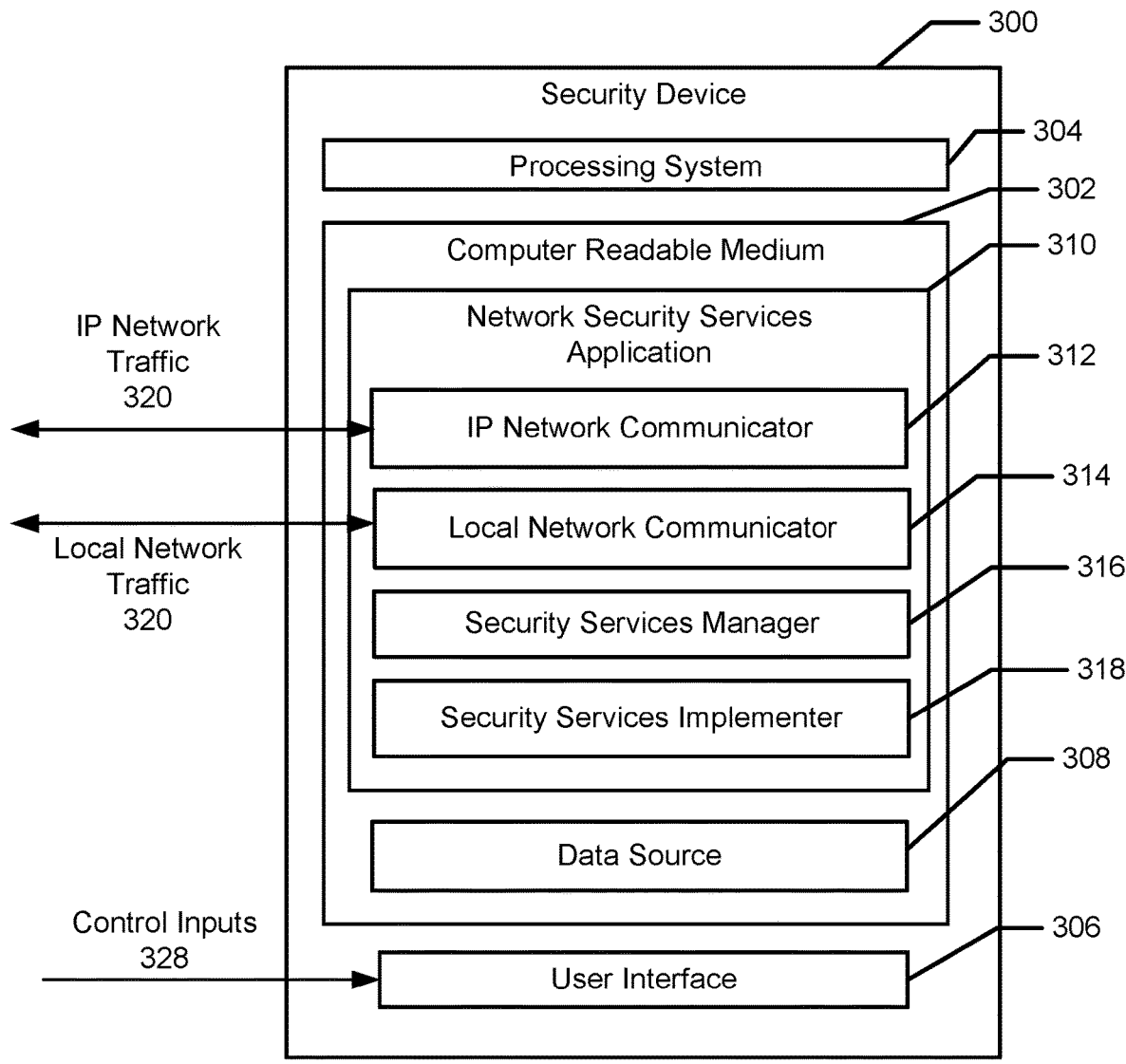
FIG. 3 is a schematic diagram illustrating an Ethernet-based security computing device to apply one or more security services of a network to local network traffic in accordance with one embodiment.

FIG. 3 is a schematic diagram illustrating an Ethernet-based security computing device 300 to apply one or more security services of a network to local network traffic in accordance with one embodiment. In some instances, a network security services application 310 may be executed on the security device 300 to perform one or more of the operations described herein. The network security services application 310 may be stored in a computer readable media 302 (e.g., memory) and executed on a processing system 304 of the security device 300 or other type of computing system, such as that described below. The computer readable medium 302 includes volatile media, nonvolatile media, removable media, non-removable media, and/or another available medium. By way of example and not limitation, non-transitory computer readable medium 302 comprises computer storage media, such as non-transient storage memory, volatile media, nonvolatile media, removable media, and/or non-removable media implemented in a method or technology for storage of information, such as computer readable instructions, data structures, program modules, or other data.

According to one embodiment, the security device 300 may also provide a user interface (e.g., a command line interface (CLI), a graphical user interface (GUI), a mechanical push-button interface etc.) 306 through which a user of the security device 300 may provide one or more control inputs 328 to configure or control aspects of the security device. For example, the control inputs 328 may be used to activate the security device 300 or to initiate a registration of the security device with a corresponding network 202 or device or system of the network. In one particular example, an input via the user interface 306 may cause the security device 300 to transmit an identifier to the security platform 220 of network 202.

The network security services application 310 may also utilize a data source 308 of the computer readable media 302 for storage of data and information associated with the security device 300. For example, the network security services application 310 may store information associated with the one or more security services provided by the corresponding network 102. Such information may include white lists of approved IP addresses, black lists of suspect IP addresses, routing information for suspected communication packets, and the like. In general, any data or information utilized by the network security services application 310 may be stored and/or retrieved via the data source 308.

The network security services application 310 may include several components to perform one or more of the operations described herein. For example, the network security services application 310 may include a network communicator 312 for receiving security policy information and/or data via a level 2 tunnel from the network 202. The network communicator 312 may also transmit communication packets received from the local network 204 to the network through a border network 216 or other connection to the backbone network. The network communicator 312 may therefore prepare and transmit information and/or data to the network 102 and receive data packets from the network, such as through the secure, level 2 tunnel. Through the network communicator 312, the security device 300 may communicate with the security platform 220 for extending security services provided by the network 202 to local networks 204.

The network security services application 310 may also include a local network communicator 314 for communicating with devices of the local network 204. For example, the security device 212 may receive communication or data packets from mobile device 208 and/or computing device 210 for transmission to the network 202. In one particular example, the local network communicator 314 may process Internet-based traffic for devices connected to model 214. The local network communication 314 may receive and/or provide data via a wireless or wired connection to the devices of the local network 204.

The network security services application 310 may further include a security services manager 316 and a security services implementer 318. The security services manager 316 may manage the extended security services from the IP network 202 to the local network 204, including but not limited to, managing a white/black list associated with a firewall security service available from the network. In this manner, the security services manager 316 may coordinate communications with the security platform 220 of the IP network 202 for applying security services to packets of the local network 204. The security services implementer 318 may be utilized by the security services manager 316 to implement one or more security services on the packets of the local network 204, including firewall protection and packet tagging, as described in more detail below. One or more of the operations of the methods described below for providing security services to a local network 204 may therefore be managed and implemented by the network security services application 310.

Figure 4:
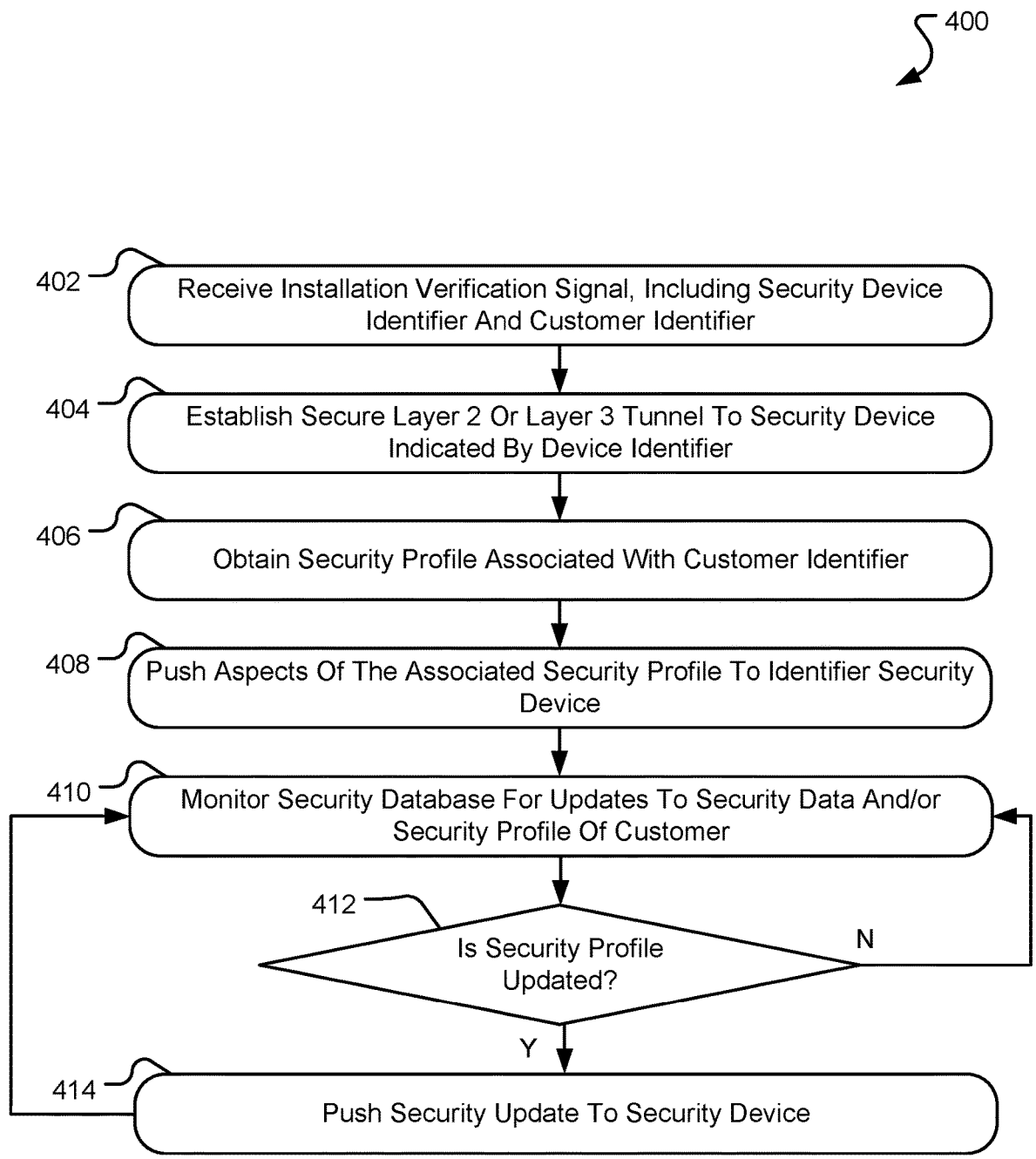
FIG. 4 is a flowchart illustrating a method for operating an Ethernet-based security device in a network environment for security management of communications associated with a local network in accordance with one embodiment.

FIG. 4 is a flowchart illustrating a method 400 for operating an Ethernet-based security device in a network 202 for security management of communications associated with a local network 204 in accordance with one embodiment. In one particular implementation, the operations of the method 400 may be performed by a security platform 220 to provide one or more security features to the security device 212 of the local network 204. In other implementations, one or more of the operations may be performed by other components of the IP network 202, the border network 216, and/or the local network 204, including the security device 212. The operations of the method 400 may be performed by hardware components, software programs, or a combination of both hardware and software components of the devices and apparatus of the network environment 200. Further, the operations of the method 400 are described herein with reference to network environment 200 of FIG. 2A, although the method may be executed on other network environments.

Beginning in operation 402, the security platform 220 may receive an installation verification signal associated with the Ethernet security device 212 of the local network 204. The installation verification signal may be received at the security platform 220 through several mechanisms or procedures. For example, an administrator of the local network 204 may connect the security device 212 "inline" between the modem 214 and one or more of the communication devices 208, 210 of the local network 204. In one particular example, an Ethernet cable may be connected between an Ethernet port of the security device 212 and an Ethernet port of the modem 214 to connect the security device 212 inline. The security device 212, upon connection to the modem 214, may be configured to call or otherwise contact the security platform 220 for initial connection. For example, the security device 212 may be programmed with an IP address associated with the security platform and, upon connection to the modem 214, may transmit a connection request to the security platform. In another example, the local network administrator may scan an identifying mark associated with the security device 212, such as a QR code, bar code, or other information containing image, with a computing device, such as a mobile device. The information mark may direct the computer device to connect to a website, user interface, or other type of portal to the security platform 220. Connection to the portal may include transmitting an identifier of the security device, such as a serial number or other unique identifier. The security platform 220 may utilize transmission of the security device identifier as the initiation signal from the security device and begin communicating with the device. In yet another example, an administrator associated with the local network 204 may access the portal, via a computing device, and initiate the installation verification signal to the security platform 220. In general, however, the installation verification signal may include an identifier of the installed security device 212 and an identifier of a customer associated with the local network 204.

In operation 404, the security platform 220 may establish a secure layer 2 or layer 3 communication tunnel 228 to the identified security device 212 installed at the local network 204. Layer 2 communications refer to the data link layer of the commonly-referenced multi-layer communication model known as the Open Systems Interconnection (OSI) model. Layer 3 communications refer to the network layer of the commonly-referenced multi-layer communication model known as the Open Systems Interconnection (OSI) model. The data link and network layers provide node-to-node data transfer via a link between two connected nodes. The data link layer may define a protocol for control of packet flow between the two connected devices. However, such communications do not generally require routing based on IP addresses associated with the two devices. The network layer will utilize the Internet Protocol and does generally require routing based on IP addresses associated with the two devices; however, the addresses used to communicate via the Layer 3 tunnel may not be public IP addresses and communication will generally be limited to the two endpoints alone unless the Security Platform directs the local Security Device to do otherwise. Rather, communications may be transmitted directly between the virtually connected devices. In general, a layer 2 or layer 3 secure tunnel may provide for secure communication between two devices over a public network, such as the Internet, through encapsulation of the transmitted packets. Thus, a secure communication tunnel 228 through border network 216 (and potentially any public networks located logically between the local network 204 and the IP network 202) may be established between security device 212 and security platform 220 of IP network 202. This secure tunnel 228 may allow for secure communications between the security device 212 and the security platform 220 without a need for assigning or establishing an IP address with the security device 212. Further, the security device 212 may communicate with the security platform 220 of IP network 202, even in configurations in which the local network 204 is not connected directly to the IP network.

In operation 406, the security platform 220 may obtain a security profile associated with the customer identifier from a database 230 of security profiles maintained by the security platform 220 of the network 202. In particular, one or more security profiles may be associated with a customer identifier included in the installation verification signal discussed above. The one or more security profiles may be stored in a database 230 of security profiles maintained by the security platform 220, among security profiles for other customers of the network 202. The security profiles may include various security information, including but not limited to white lists of approved or allowed IP addresses, black lists of suspect or denied IP addresses, IP addresses associated with devices connected to the local network 204 or other devices of the network 202, identifiers of suspected malware, identifiers of known computer viruses, and the like. In some instances, aspects of the security profile associated with the local network 204 may be configurable by an administrator of the local network 204 via the portal discussed above. For example, the web portal or user interface accessed by scanning the identifying mark associated with the security device 212 may provide for configuration of the security policy associated with the local network. Such configurations may include editing a white list and/or black list of IP addresses, activating updating of the white list and/or the black list by the network 202 based on obtained security data, activating and/or deactivating the security device 212, and the like. The security policy may also be updated or configured by one or more devices of the IP network 202, such as the security platform 220. In one implementation, the security platform 220 may obtain threat intelligence data including source or destination IP addresses associated with packets known or suspected to be malicious or part of an attack on the network. Such threat intelligence data may be identified by the network 202 in response to a suspected attack on devices associated with the network or from third party providers of threat data. Identified suspicious IP addresses may be stored in the security database 230 for use by the security platform 220 or local security device 212 to provide the security features to the IP network 202, local network 204, or other networks or devices associated with the IP network. For example, an IP address of a suspected attack may be included in a black list of suspect IP addresses and stored in the security database 230 for dispersal to security devices connected to the network 202.

The security platform 220 may push, in operation 408, one or more aspects of the associated security policy to the local security device 212 via the layer 2 or layer 3 secure tunnel 228. For example, the security platform 220 may provide a white list of allowed IP addresses to the security device 212 for application of the white list to communications into or out of the local network 204. In one implementation, the security device 212 may analyze communication packets transmitted from the communication devices 208, 210 of the local network 204 intended for the Internet 206 or other destination and obtain a destination IP address for the outgoing packet. The security device 212 may further compare the destination IP address for the packet to the white list of allowed IP addresses received from the security platform 220 and, if the IP addresses is on the white list, the packet may be allowed to be sent from the local network 204. In a similar manner, the security device 212 may compare IP addresses in communication packets to a black list of denied IP addresses received from the security platform 220 and, when a packet includes an IP address in the header that matches an IP address on the black list, drops the communication packet. Other security features may also be performed on the traffic associated with the local network 204 by the security device 212 based on the aspects of the security policy provided by the security platform 220 over the secure tunnel 228, such as scanning for computer viruses or malware, flagging suspicious packets, and/or rerouting suspicious packets to a security device of the network 202 for further processing. In this manner, the security platform 220 or other device of the network 202 may control or manage the local security device 212 at the local network 204, regardless of whether the security device or local network connects to the network 202 via one or more third party border networks 216.

As mentioned above, the security database 230 may be updated with security threat information from the network 202 or a third party. For example, newly detected malicious IP addresses may be added to the database 230 as IP addresses from which communications may be deemed suspect as a part of an attack on the network 202. In operation 410 of the method 400, the security platform 220 of network 202 may monitor the database 230 for updates to the security data stored thereon and determine if said updates may be provided to security devices 212 connected to the network 202. In addition to updating a security profile with information obtained from a third party, the security profile associated with the local network 204 may also be individually updated, either by a device of the network 202 or via the portal associated with the security platform 220. For example, an administrator of the local network 204 may edit the white list or black list associated with the local network via the portal to allow or deny particular IP addresses for communications associated with the local network 204. Such an update may be included in the security profile for the local network 204 based on information received by the administrator, such as a particular IP address in which the local network 204 as deemed safe. In another example, the security profile for the local network 204 may include a setting to automatically update the black list for the network based on the threat intelligence data provided to the database 230 when a suspected IP address is determined or received at the security platform 220. The update setting may be configurable via the portal to the security platform 220 and may be unique to the security profile associated with the local network 204. Thus, the security platform 220 may also monitor the database 230 for updates to the security profile associated with the local network 204 in operation 410 to determine if updates from the database or the via the user interface have been added to the security profile.

If the security platform 220 determines, in operation 412, that the security database 230 and/or the security profile for the local network 204 has not been updated, the platform may continue to monitor for such updates to the profile. However, upon a detected update to the security profile or database 230 as applicable to the local network 204, the security platform 220 may push update information to the security device 212 via the secure tunnel 228 in operation 414. The updates transmitted via the secure tunnel 228 may be processed by the security device 212. For example, the white list and/or black list maintained by the security device 212 may be updated with IP address information received via the secure communication tunnel 228. In this manner, the security platform 220 may continue to control and/or manage the security device 212 of the local network 204 via the layer 2 or layer 3 communication tunnel 228.

Figure 2B:
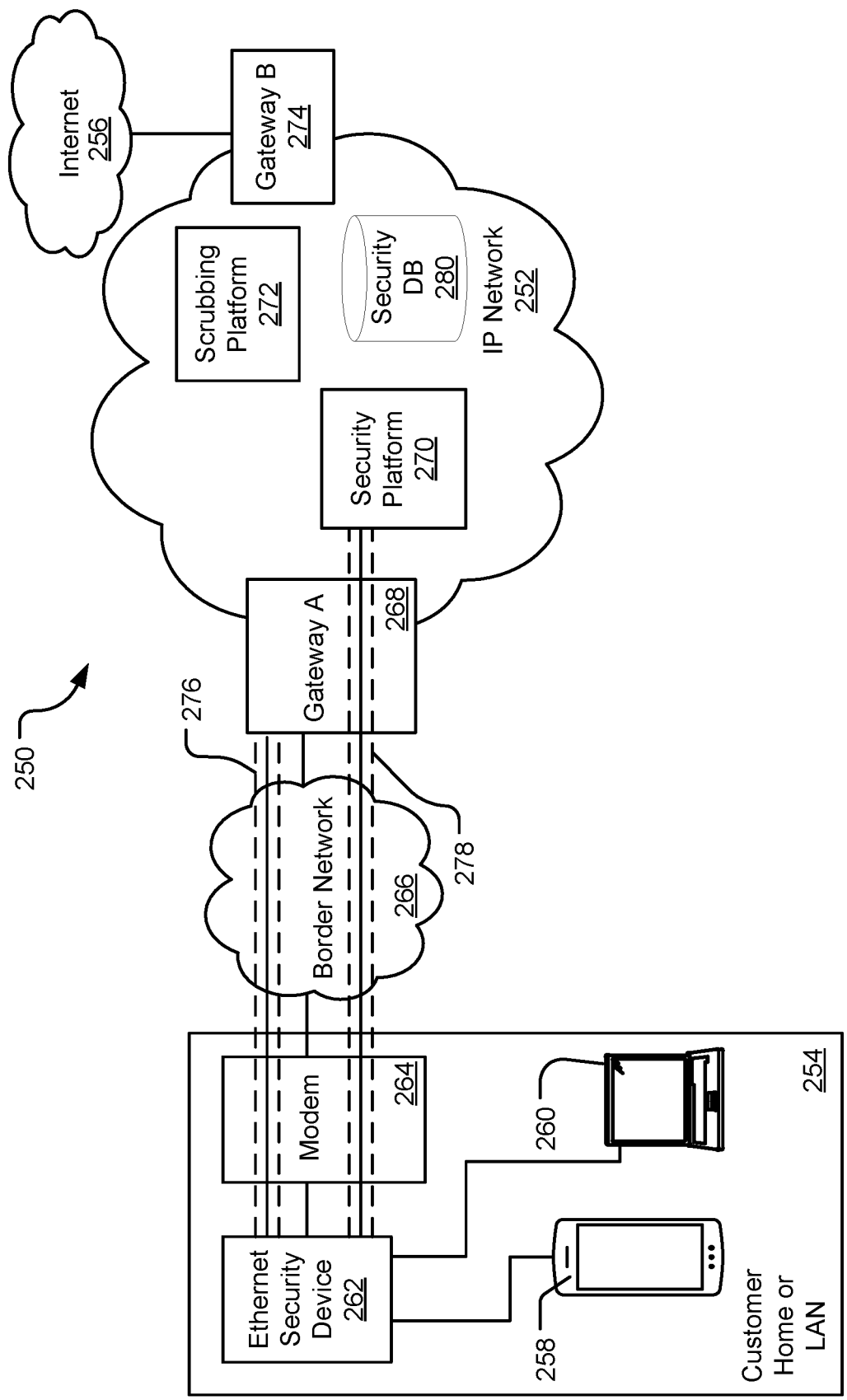
FIG. 2B is a schematic diagram illustrating an Ethernet-based security device in a network environment for security management of communications associated with a local network in accordance with another embodiment.
Figure 5:
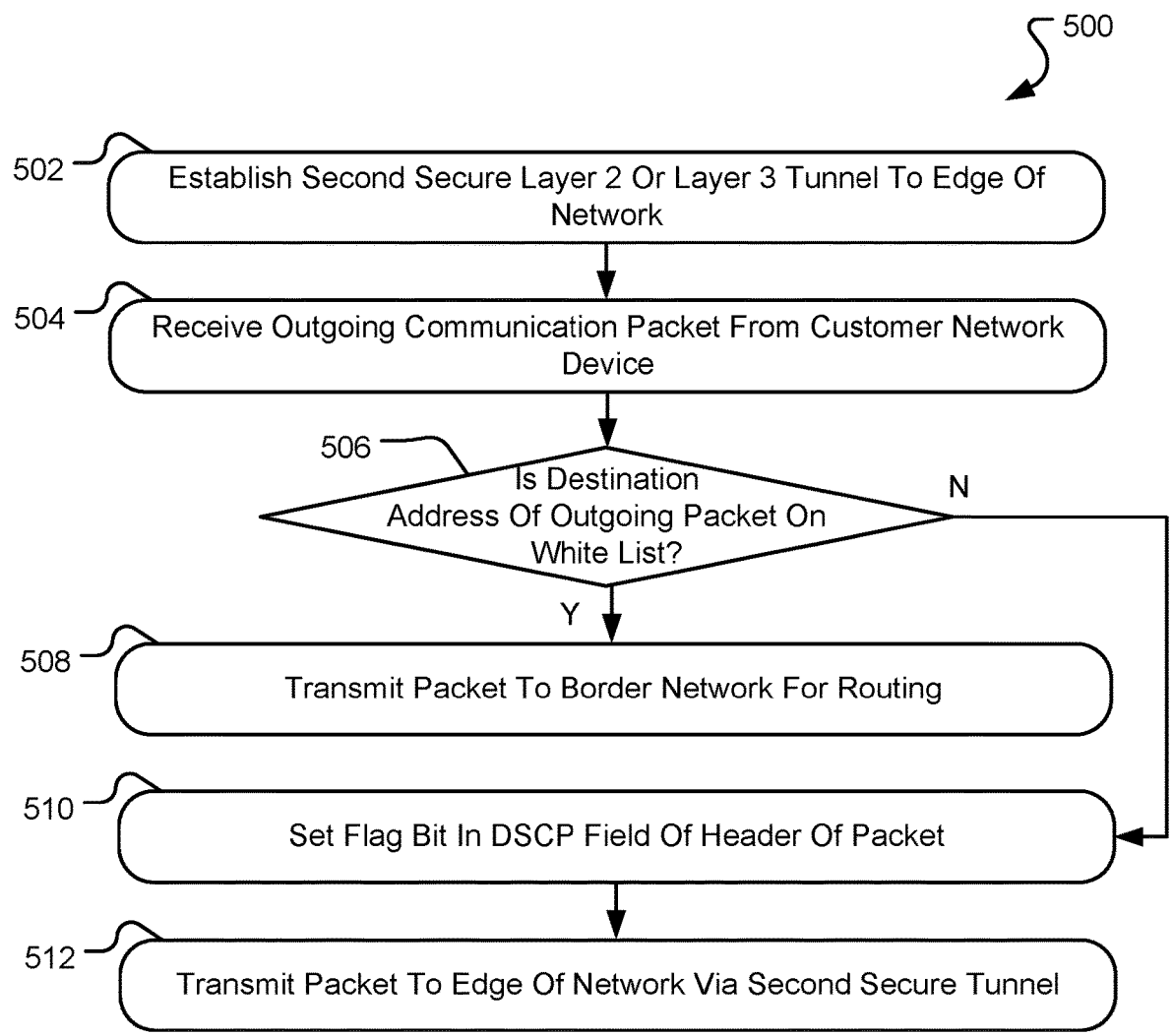
FIG. 5 is a flowchart illustrating a method for operating an Ethernet-based security device in a network environment for security management of communications associated with a local network in accordance with another embodiment.

In some instances, however, the security device 212 may provide a more simplified gatekeeping security function for the communications into or out of the local network 204. For example, FIG. 2B is a schematic diagram illustrating an Ethernet-based security device 262 in a network environment 250 for security management of communications associated with a local network 254 in accordance with another embodiment. Many of the components of the network environment 250 of FIG. 2B are similar to those described above with reference to FIG. 2A, including IP network 252, Internet network 256, border network 266, and local network 254 and the associated components of each network. Security device 262 and security platform 270, as described above with relation to FIG. 2A, may also be included in the network environment 250. However, in the implementation of FIG. 2B, the security device 262 may include a more limited operation to provide security features to the local network 254. In particular, FIG. 5 is a flowchart illustrating a method 500 for operating an Ethernet-based security device 262 in a network environment 250 for security management of communications associated with a local network 254 in accordance with one embodiment. Through the operations of the method 500 of FIG. 5, security features available from network 252 may be provided to local network 254 although the local network is connected to the network via the border network 266.

In one implementation, the operations of the method 500 of FIG. 5 may be performed by a local security device 262 connected to a customer home network or LAN 254, referred to herein as a "local network". In other implementations, one or more of the operations may be performed by other components of the network environment 250 or other network devices not illustrated. The operations may be executed by one or more hardware components, software programs, or a combination of both hardware and software components. In addition, the operations of the method 500 may be performed following operations 402-408 of the method 400 of FIG. 4 described above. In particular, the security platform 270 may receive an installation verification signal associated with the security device 262 of the local network 254 and a secure, layer 2 or layer 3 communication tunnel 278 may be established between the security device 262 and the security platform 270 for management and control of the security device 262 by the security platform 270. In addition, the security platform 270 may obtain a security profile stored in a database 280 associated with the local network 254 and push one or more aspects of the security profile to the security device 262. In one particular example, the security platform 270 may provide a white list of allowed IP addresses from the security profile to the security device 262 via the secure tunnel 278. The security profile of the local network 254 may also instruct the security device 262 of the local network 254 to perform one or more of the operations of method 500 of FIG. 5.

Beginning in operation 502, the security device 262 may establish a second secure, layer 2 or layer 3 communication tunnel 276 to the edge of the network 252. In particular, the security device 262 may establish a secure communication tunnel 276 to a gateway device 268 or other edge device of the network 252. As above, the secure communication tunnel 276 provides for encrypted exchange of layer 2 or layer 3 communications between the connected devices over one or more public networks between the two devices. In operation 504, the security device 262 may receive an outgoing communication packet from a device associated with the local network 254, such as computing device 260 or mobile device 258. The outgoing packet may be intended for any destination device, such as a device of border network 266, IP network 252, or the broader Internet 256. To identify the intended destination of the communication, the packet may include destination information in a header or other portion of the packet. In one implementation, the packet may include a destination IP address associated with a device or network to receive the packet. The security device 262 may analyze the received packet and obtain the destination IP address of the communication packet from the header or other portion of the packet.

In operation 506, the security device 262 may determine if the destination address obtained from the packet is included in the white list provided to the security device from the security platform 270. As mentioned above, the security platform 270 may provide a white list of approved IP addresses to the security device 262 via the first secure tunnel 278. The security device 262 may store the white list and compare destination IP addresses of received packets to the IP addresses included in the white list. As the white list includes approved destination addresses, the security device 262 may, in operation 508, transmit the communication packet to the border network 266 via the modem 264 for traditional routing of the packet based on the destination address. In other words, packets intended for a destination address that is indicated as allowed by the white list may be routed without additional security procedures applied to the packet.

If the security device 262 determines that the destination address for the packet is not included in the white list, the device may, in operation 510, set a flag bit in a header field of the packet. In one particular implementation, a bit of the Differentiated Services Code Point (DSCP) field of the header of the packet may be set by the security device 262. In general, the DSCP field of a packet header is six bits within the header of the packet that is typically used to indicate a quality of service requested for the packet. However, in this implementation, the security device 262 may utilize a bit within the DSCP field to indicate a packet that is not included in a white list of the local network 254. As explained in more detail below, the flag bit of the DSCP field may be utilized by the network 252 to provide one or more security features for the packet. Upon setting the flag bit of the packet header, the security device 262 may transmit the altered packet to the edge device 268 of the network 252 via the second secure communication tunnel 276 in operation 512. In this manner, the security device 262 may flag communication packets from devices of the local network 254 for further security processing by the network 252, as explained in more detail below. Packets indicated as allowable based on the white list associated with the local network 254 as provided by the security platform 270 may be routed without further security processing.

Through the method 500 described above, the security device 262 may flag outgoing communications and securely provide the communications to the edge of the network 252. In the example illustrated in FIG. 2B, gateway device A 268 may receive, via secure tunnel 276, communication packets with a bit of the DSCP field of the packet header set by the security device 262. Gateway A 268, and other edge devices of the network 252, may be configured to determine if the flag bit of the DSCP field is set for communication packets received at the device. In one implementation, gateway A 268 may obtain the flag bit status for each communication packet received over secure tunnel 276. In another implementation, the edge device 268 may be configured to determine the status of the flag bit for all communication packets received at the gateway. Regardless of the implementation, gateway A 268 may, upon determining the flag bit of the DSCP field is asserted, route the corresponding communication packet to a security device of the network 252 for additional security processing by the network. For example, gateway A 268 may be configured to transmit packets with an asserted flag bit to a scrubbing platform 272. In general, scrubbing platform 272 may be a network device configured to execute one or more security features on received packets. The scrubbing platform 272 may execute aspects of the security profile associated with the local network 254, such as dropping a packet with a destination IP address that is included in a black list of IP addresses associated with the local network 254. As such, the scrubbing platform 272 may also communicate with security database 280 to obtain information associated with local network 254. In another implementation, the scrubbing platform 272 may apply a global security profile of the network 252 to all communications received at the scrubbing platform, regardless of the originating local network 254. The black list utilized by the scrubbing platform 272 may include threat intelligence data obtained by the network 252 or from a third party database of suspected threats. In yet another implementation, the edge device 268 receiving the flagged communication may execute one or more of the security features of the network 252. After processing of the communication packet, the gateway 268 and/or the scrubbing platform 272 may unassert the flag bit of the DSCP field of the header for further transmission of the packet to the intended destination device.

Through the systems and methods described herein, a fully functional, out-of-the-box security device 212 may be provided by a network 202 to extend security features offered by the network to local networks 204 connected direct to the network or connected to the network via one or more other networks. Installation of the security device 212 at the local network 204 may include an Ethernet-based connection inline of the local network 204 from which a secure, layer 2 or layer 3 communication tunnel 228 may be established with a security platform 220 of the network 202. Aspects of the security device 212, such as a security profile and other security information, may be configured or provided by the security platform 220 via the secure tunnel 228 such that installation costs of the device are reduced. Further, the security features of the network 202 may be extended to the local network 204 via the security device 212 for local networks that connect to the IP network 202 through one or more other networks. Such security features may be provided by the security device 212 at the local network 204 or may be provided by the network 202 based on a flag bit asserted by the security device 212. The flag bit may be used by the network 202 to identify packets from the local network 204 for additional security processing and may be received via a second secure, layer 2 or layer 3 communication tunnel. In this manner, security features of the network 202 may be provided via the security device 212 with little customer or administrator involvement in the deployment and configuring of the device.

In still another implementation, the security device 212 of the local network 204 may provide additional features to communications of the local network 204. For example, the security device 212 may provide Virtual Local Area Network (VLAN) support to communications of the local network 204. In general, a VLAN is a virtual network that utilizes a VLAN identifier included in a portion of communication packets to separate the packets into VLAN customers while utilizing the same IP address, ports, devices, and the like. The security device 212 may, in this scenario, be configured to apply security policies to particular packets based on a VLAN identifier included in the packet. Thus, for multiple customers that may use the same security device 212, different policies may be applied to the different customers based on the VLAN identifier associated with a received communication packet. In this manner, the security device 212 may support VLAN traffic within the local network 204 and apply corresponding security profiles to the individual VLAN packets based on a VLAN identifier.

Figure 6:
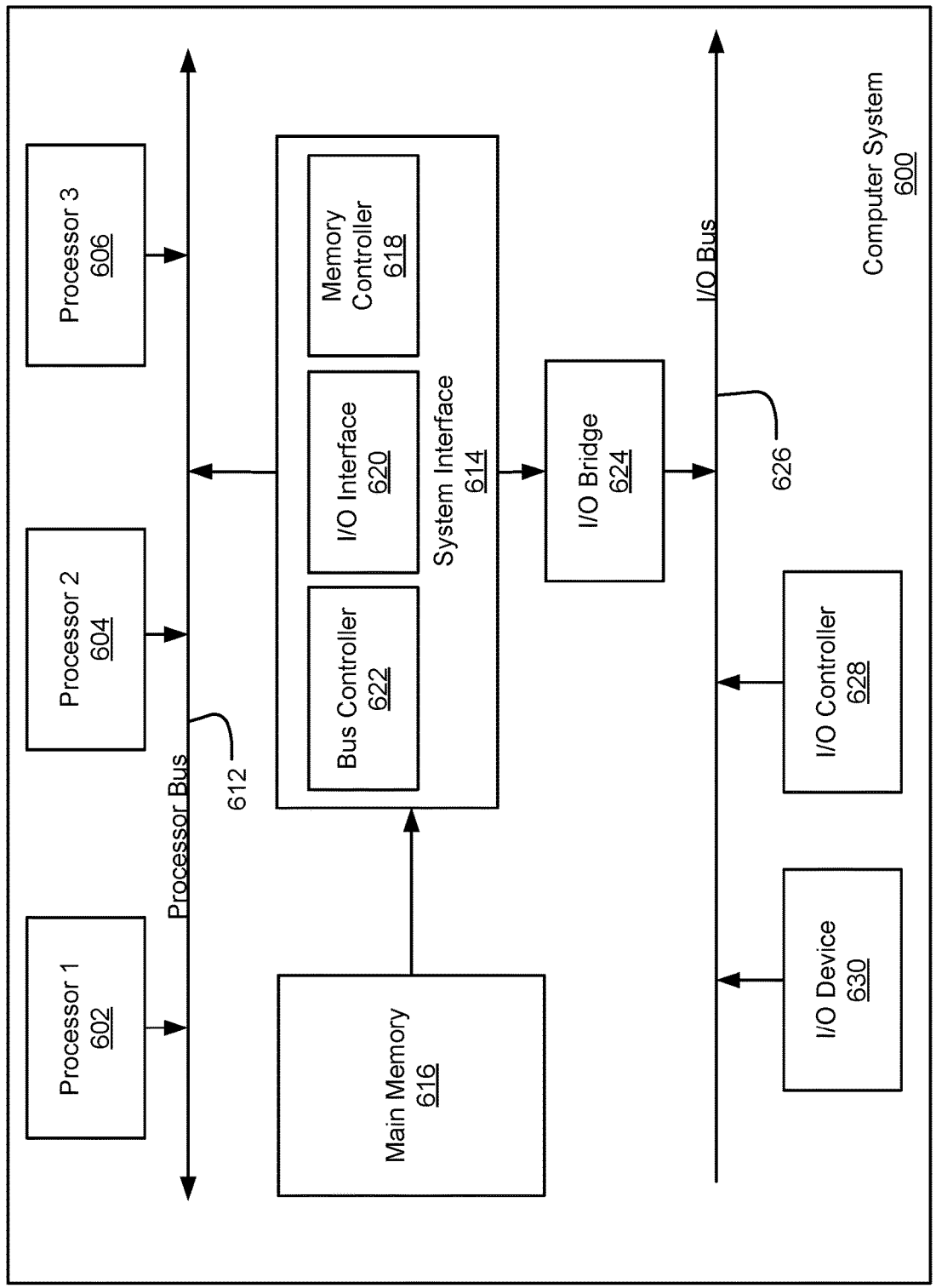
FIG. 6 is a diagram illustrating an example of a computing system which may be used in implementing embodiments of the present disclosure.

FIG. 6 is a block diagram illustrating an example of a computing device or computer system 600 which may be used in implementing the embodiments of the components of the network disclosed above. For example, the computing system 600 of FIG. 6 may be the security device 212 discussed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 618 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 616, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

I claim:

1. A device providing security features of a network, the device comprising:
   a processing device; and
   a non-transitory computer-readable medium encoded with instructions, when executed by the processing device, cause the processing device to perform the operations of:
      receiving, via a layer 2 or layer 3 encryption communication tunnel to a security system of a communication network, a processing rule for transmission of communication packets originating from a local network device, the processing rule associated with a security profile of a local area network;
      obtaining a destination address associated with a communication packet received from the local network device;
      asserting, based on the processing rule, a flag bit in a header portion of the communication packet; and
      transmitting, based on a comparison of the destination address to the processing rule, the communication packet to an edge device of the communication network.

2. The device of claim 1, wherein asserting the flag bit comprises asserting a bit of a Differentiated Services Code Point (DSCP) field of the communication packet.

3. The device of claim 1, wherein a second processing rule is applied, by a network device, to the communication packet based on the asserted flag bit.

4. The device of claim 3, wherein the second processing rule comprises routing the communication packet to a packet scrubbing platform to discard the communication packet based on network threat information.

5. The device of claim 1, wherein the processing rule comprises a white list of allowed destination addresses and transmitting the communication packet comprises routing the communication packet based on the allowed destination address.

6. The device of claim 1, wherein the instructions further cause the processing device to perform the operation of:
   updating the processing rule based on network threat information received via the layer 2 or layer 3 encryption communication tunnel.

7. The device of claim 1, wherein the instructions further case the processing device to perform the operation of:
   establishing a second encryption communication tunnel to the edge device of the network for transmission of the communication packet.

8. The device of claim 1, connected inline between the local network device and a modem of the local area network.

9. A method for operating a data network, the method comprising:
   establishing a secure encryption communication tunnel between a security device located in a local area network and a security system of a communication network;
   receiving, at the local security device from the security system via the secure encryption communication tunnel, a processing rule for transmission of communication packets originating from the local area network;
   obtaining a destination address associated with a communication packet received from a local network device in communication with the local area network;
   asserting, based on the processing rule, a flag bit in a header portion of the communication packet; and
   transmitting, based on a comparison of the destination address to the processing rule, the communication packet to an edge device of the communication network.

10. The method of claim 9, wherein the secure encryption communication tunnel is an Ethernet-based layer 2 or Internet Protocol-based layer 3 communication tunnel.

11. The method of claim 9,
    wherein the security system routes the communication packet to a scrubbing environment of the communication network based on the asserted flag bit.

12. The method of claim 11, wherein asserting the flag bit comprises asserting a bit of a Differentiated Services Code Point (DSCP) field of the communication packet.

13. The method of claim 9, further comprising:
    establishing a second encryption communication tunnel to the edge device of the network for transmission of the communication packet.

* * * * *